United States Patent
Pinto et al.

(10) Patent No.: US 10,057,300 B2
(45) Date of Patent: Aug. 21, 2018

(54) SELECTIVE ACCESS CONTROL TO MOBILE IP NETWORK

(71) Applicant: Kajeet, Inc., Bethesda, MD (US)

(72) Inventors: David Pinto, Rockville, MD (US); John Shorey, Penhook, VA (US)

(73) Assignee: KAJEET, INC., McLean, VA (US)

(*) Notice: Subject to any disclaimer, the term of this patent is extended or adjusted under 35 U.S.C. 154(b) by 141 days.

(21) Appl. No.: 14/102,452

(22) Filed: Dec. 10, 2013

(65) Prior Publication Data

US 2014/0164616 A1    Jun. 12, 2014

Related U.S. Application Data

(60) Provisional application No. 61/735,946, filed on Dec. 11, 2012.

(51) Int. Cl.
| | | |
|---|---|---|
| *H04L 12/24* | (2006.01) | |
| *H04L 29/06* | (2006.01) | |
| *H04L 29/12* | (2006.01) | |

(52) U.S. Cl.
CPC ........ *H04L 65/103* (2013.01); *H04L 61/1511* (2013.01)

(58) Field of Classification Search
CPC ................................................. H04L 29/0602
USPC ........................................................ 709/225
See application file for complete search history.

(56) References Cited

U.S. PATENT DOCUMENTS

| | | | | |
|---|---|---|---|---|
| 2007/0192858 A1* | 8/2007 | Lum | ................. | H04L 29/12028 726/22 |
| 2007/0294419 A1* | 12/2007 | Ulevitch | ........... | H04L 29/12066 709/230 |
| 2008/0147787 A1* | 6/2008 | Wilkinson | .............. | G06F 9/505 709/203 |
| 2009/0144752 A1* | 6/2009 | Shneerson | .......... | G06F 9/44526 719/316 |
| 2009/0238135 A1* | 9/2009 | De | ........................ | H04W 28/24 370/329 |
| 2009/0262741 A1* | 10/2009 | Jungck | .............. | H04L 29/12066 370/392 |
| 2011/0225419 A1* | 9/2011 | Munger | .............. | H04L 61/2007 713/153 |
| 2012/0324568 A1* | 12/2012 | Wyatt | ..................... | G06F 21/51 726/13 |
| 2013/0227283 A1* | 8/2013 | Williamson | .......... | H04L 9/0825 713/168 |
| 2013/0227284 A1* | 8/2013 | Pfeffer | ................ | H04L 63/0236 713/168 |
| 2013/0298201 A1* | 11/2013 | Aravindakshan | ... | H04L 63/0272 726/4 |

(Continued)

*Primary Examiner* — Moustafa M Meky
*Assistant Examiner* — Elizabeth Kassa
(74) *Attorney, Agent, or Firm* — Baker & Hostetler LLP

(57) ABSTRACT

Systems and methods are described for managing access of a computing device to services over a mobile network where requests for managed or unmanaged services are translated to corresponding IP addresses sent to the computing device and corresponding requests sent to the translated IP addresses are permitted if the computing device has a valid data plan for using the mobile network, are denied if the computing device does not have a valid data plan and the request corresponds to the first address, and are permitted even if the computing device does not have a valid data plan if the request corresponds to the second address.

17 Claims, 4 Drawing Sheets

(56) References Cited

U.S. PATENT DOCUMENTS

2014/0089488 A1\* 3/2014 Chong ................ H04L 41/0659
                                                                                                                               709/223

\* cited by examiner

SELECTIVE ACCESS CONTROL TO MOBILE IP NETWORK

CROSS REFERENCE TO RELATED APPLICATIONS

This application claims benefit under 35 U.S.C. § 119(e) of Provisional U.S. Patent Application No. 61/735,946, filed Dec. 11, 2012, the contents of which is incorporated herein by reference in its entirety.

TECHNICAL FIELD

The present disclosure relates to system for managing access of a computing device to network services.

BACKGROUND

Personal computers and other types of computing devices typically come equipped with a pre-installed operating system and various application programs for performing typical functions, such as word processing programs for word processing and browser programs for accessing the Internet, email, etc. Some such devices come installed only with enough software to allow the device to boot up, thereafter requiring the user to select and install an operating system and any desired application programs. Other devices include an operating system, but do not include applications to be installed on the device, because the operating system is designed to access such applications over a network. Such devices are designed to be used while connected to the Internet or other networks and support applications that reside on the World Wide Web (the "Web"), for example, instead of being installed on the device.

One such device is the GOOGLE CHROMEBOOK, which is shipped with CHROME OS, which uses the LINUX kernel, and the GOOGLE CHROME Web browser with an integrated media player. The CHROMEBOOK has limited offline capability and is primarily designed to be used while connected to the Internet. Users may add desired applications for the CHROMEBOOK from the CHROME Web store.

To make use of such applications, however, it is necessary for the devices to have access to an Internet connection and to stay connected during use, which requires the user to either be connected to a wired or wireless access point and typically to have contracted with a network access provider to obtain access and sufficient bandwidth to make use of the applications. When traditional access methods are not available, or the user has not paid for access or has exceeded access limitations, the device will not be able to access the Web-based or other network-based applications, limiting the effectiveness and usefulness of the device.

SUMMARY

Systems and methods are described for managing access of a computing device to services over a mobile network where requests for managed or unmanaged services are translated to corresponding IP addresses sent to the computing device and corresponding requests sent to the translated IP addresses are permitted if the computing device has a valid data plan for using the mobile network, are denied if the computing device does not have a valid data plan and the request corresponds to the first address, and are permitted even if the computing device does not have a valid data plan if the request corresponds to the second address.

DETAILED DESCRIPTION OF ILLUSTRATIVE EMBODIMENTS

For computing devices that only access applications over the Internet, a user is only able to access those applications, and any documents created based on those applications, when the device is connected to the Internet via a data network connection, such a Radio Access Network (RAN), Wi-Fi, etc. connection, and when the user has a then valid data plan. If the user has no data plan, or network connection, or the user has a data plan and access to a network connection, but has exceeded a time or pricing limit for the data plan, the user will not be able to access the applications or any documents created from those applications, including the user's email, calendar, contacts, etc.

In an embodiment, the computing device may be provided with an embedded connection to the Web or cloud via the RAN that is essentially invisible to the user. This embodiment allows users that do not have a data plan or that have used up their data plan quota (time/price/bandwidth, etc.) to still have access to certain application services, such as email, disk drive storage, etc., while blocking other application services, such as search, news, etc.

Figure 1:
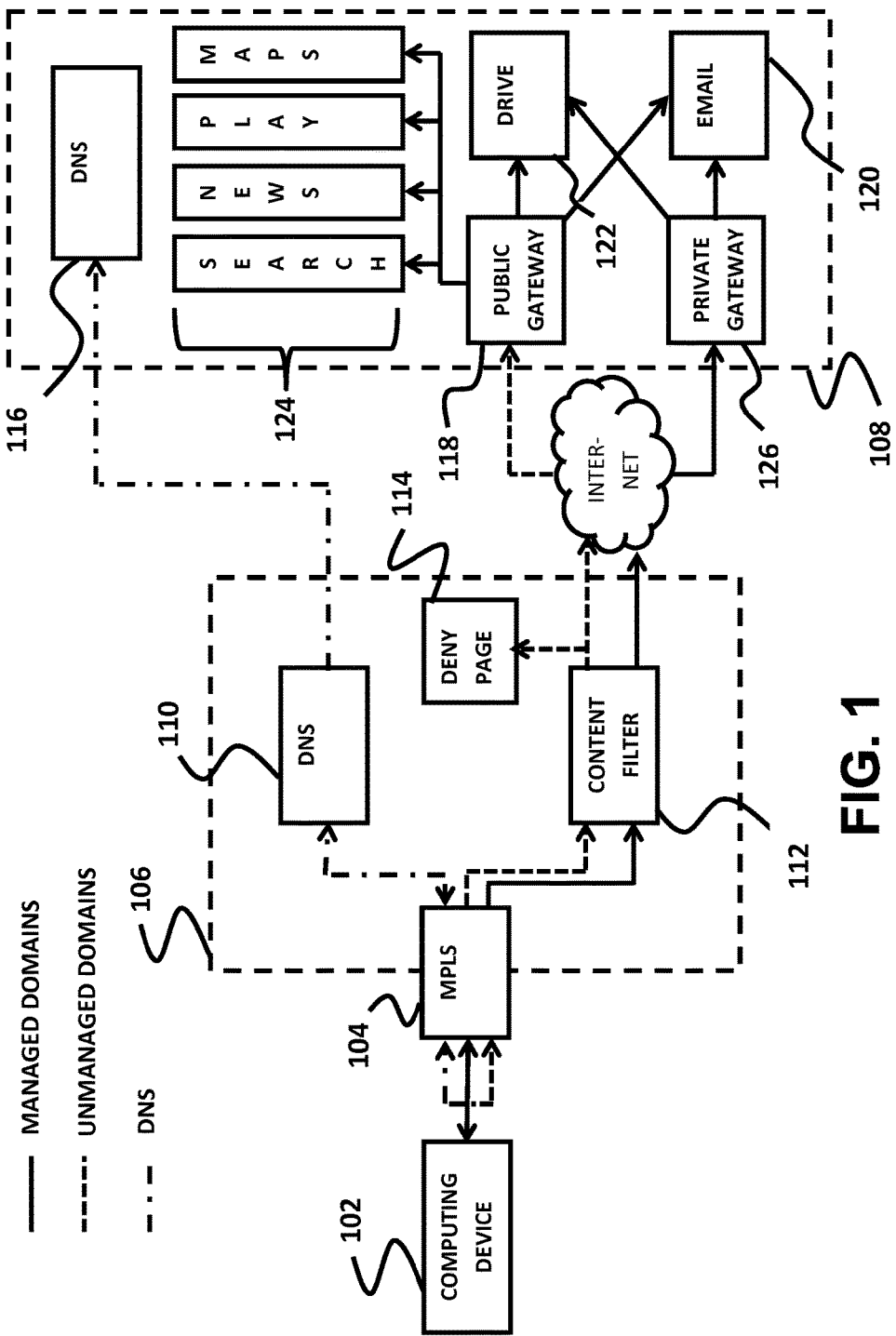
FIG. 1 is a diagram of an embodiment of a selective access control network for a computing device.

As illustrated in FIG. 1, a computing device 102 is connected to a multiprotocol label switching (MPLS) platform 104 for a network service provider. The computer device issues various requests to access different URLs or IP addresses that form inputs to the MPLS platform 104. The MPLS platform 104 may direct the requests and data from the computing device 102 to other devices in or accessible from an access control provider's system 106 based on short path labels rather than long network addresses, thereby avoiding complex lookups in routing tables. The labels may identify virtual links or paths between nodes rather than endpoints and may encapsulate packets of various network protocols. Hence, requests to access different URLs or IP addresses are received by MPLS 104 and labeled with short path labels as DNS requests, managed domains requests or unmanaged domains requests. The MPLS 104 may the route the requests using the short path labels as appropriate to different locations within the access control provider's system 106.

When the applications or services accessible on the application provider's network 108 through the computing device 102 are associated with unique IP addresses, or even ranges of IP addresses, controlling access to the applications may be straightforward. A requested URL/URI or IP address for an accessible service may be allowed through to the DNS server 110, and a request to an access controlled service may be redirected by a content filter 112 to a customized deny page 114.

However, some application providers do not associate a unique IP address or range of IP addresses with particular applications or services. The same IP address may provide access to multiple services. In addition, many of the services may be provided over secure socket layer (SSL), which causes the requested URI to be encrypted, thereby making it impossible to associate a request that arrives over the SSL with a specific service of the application provider and therefore making it impossible to allow or block the request.

In an embodiment, a solution may be provided to the problems associated with application providers that provide services with SSL and/or do not associate different services with unique IP addresses. As illustrated in FIG. 1, the computing device 102 may be provided with an embedded connection to the MPLS 104. All DNS requests received from the computing device 102 may be routed to DNS server 110, which translates the DNS request to manage domains that belong to new IP addresses provided by the application provider. The application provider provides a new IP address (meaning an IP address that does not currently exist on the application provider's DNS server 116) for every service, including those that should remain available to the computing device, even if the computing device is not currently supported by a data plan. For example, if a user of the computing device 102 made a request for email.com or drive.application.com, which are managed domains for allowed services, the DNS server 110 may translate each request to the IP address provided by the application provider for allowed services (i.e., email.com would be translated to x.x.x.x and drive.application.com would be translated to y.y.y.y).

On the other hand, the DNS server 110 cannot translate requests for unmanaged domains for disallowed services, so the request may be sent through to the application service provider's DNS server 116, where it is translated to an IP address (i.e., search.application.com would be translated to z.z.z.z). The translated IP addresses for the allowed and disallowed services would then be sent back to the computing device 102 via DNS server 110, which allows the access control provider to manage access to those services. At the same time, the translated IP address for the allowed services may not be published by the application providers DNS server 116 so as to prevent unauthorized access to those services from outside of the access provider's system. It is also best if the translated IP addresses are whitelisted to the access control provider's DNS server 110 and are not loaded to any publicly accessible DNS.

The translated requests may then be routed by the MPLS 104 to the content filter 112, which decides whether to permit the service request or deny the service request. When the user of the computing device 102 still has a valid data plan, all requests may be routed as requests for unmanaged domains by the content filter 112, which may send the requests through the Internet to the public gateway 118, where all regularly accessible applications/services may be accessed, such as email 120 and drive storage 122, as well as applications 124 which might be inaccessible under certain circumstances. When the user of the computing device 102 has an invalid data plan, requests for permitted services may be routed through the Internet to private gateway 126, where allowed services, such as email 120 and drive storage 122 may be allowed, but access to other applications, such as applications 124 may not be possible. At the same time, when the data plan is not valid, requests to access controlled services may be routed to deny page 114 instead.

Figure 2:
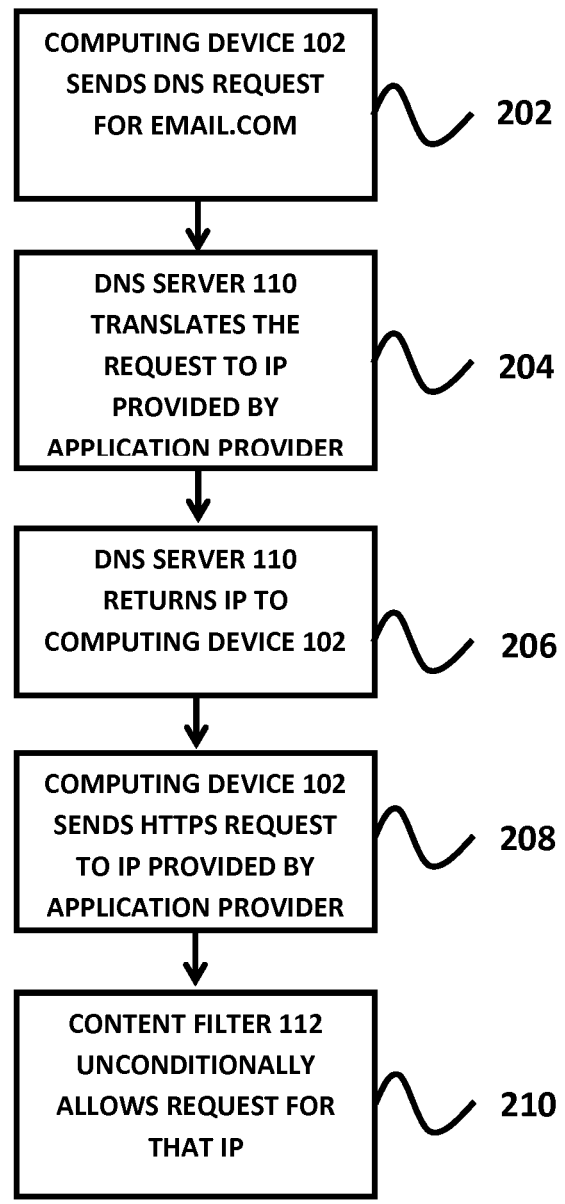
FIG. 2 is a flow chart illustrating an embodiment for handling requests to managed domains.

As a further explanation of the above process, requests to managed domains, e.g., email.com, may be handled as further illustrated in FIG. 2. When the computer device 102 sends a DNS request for a managed domain (permitted service), step 202, the DNS server 110 may translate the managed domain request to the IP address provided by the application provider 204. The DNS server 110 then returns that IP address to the computing device 102, step 206. The computing device 102 then sends an HTTPS request to the IP address provided by the application provider, step 208. The MPLS may then translate that HTTPS request to a short path label and route that label to the content filter 112, which may be configured to unconditionally allow requests to that path (IP address) and therefore permit the request to go through to the service so requested, step 210.

Figure 3:
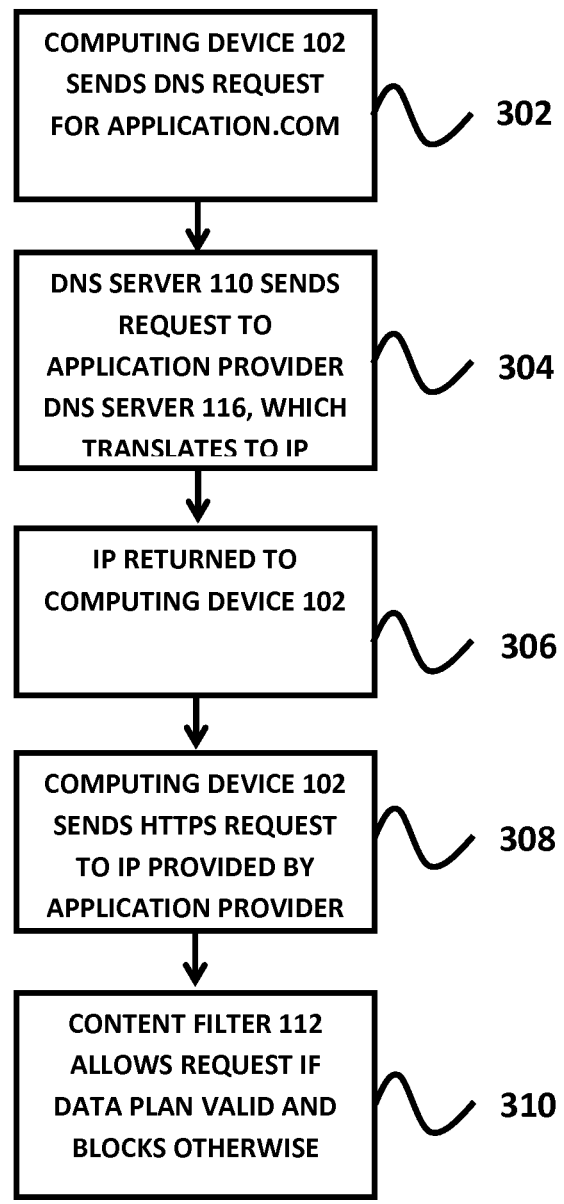
FIG. 3 is a flow chart illustrating an embodiment for handling requests to an unmanaged domain.

In contrast, requests to unmanaged domains, such as application.com may be handled in accordance with FIG. 3. In step 302, the computing device 102 sends a request for application.com, which is an unmanaged domain. The DNS server 110 cannot translate the DNS as it has no IP address that corresponds to it from the application provider, so the request is sent through to the DNS server 116, step 304, which provides the translation and returns this to DNS server 110, which returns the IP address to the computing device 102, step 306. The computing device 102 then sends an HTTPS request to that IP, step 308, the short label for which may be allowed by the content filter 112 if the data plan is valid, by routing the request through the Internet to the public gateway 118, or denying the request, if the data plan is not valid, step 310.

In accordance with the embodiment, if the computing device 102 is within range of the RAN (which is almost ubiquitous), then the computing device can access applications, services, documents, email, contacts, calendars, and other permitted services, even if the user does not have a data plan, does not have a valid data plan, or is without access to Wi-Fi. Provision of such a feature removes a major difference between more traditional computing devices that store applications and documents on the computing devices themselves and this new form of computing device that stores applications and documents over the cloud. Both devices now have local access to applications and documents when otherwise disconnected.

In an embodiment, the providers of the computing devices may contract in advance with access service providers to enable their computing devices, and therefore the users of their computing devices, to have a certain level of controlled access all of the time, even when the user of the computer device does not have a data plan or a valid data plan. For example, GOOGLE could contract with various access service providers to make sure that a GOOGLE CHROMEBOOK always had access to a network when a user of a GOOGLE CHROMEBOOK was attempting to use a GOOGLE application, regardless of any relationships between the user and the access providers. If desired, such access could be kept completely secret to the user, i.e., the device works when accessing some applications and does not when accessing others, without any explanation as to why. Third parties could also contract to provide access to networked applications accessible from user's devices. For example, in a workplace environment, a mall, a college campus, etc., an entity (such as an employer, a store, or an advertiser) could provide free network access to any users of such devices regardless of whether the user's otherwise had network access rights. Such access may be provided in secret, but could also be advertised in some manner, such as routing requests from the content filter to a advertising page instead of the deny page 114.

A number of computing systems have been described throughout this disclosure. The descriptions of these systems are not intended to limit the teachings or applicability of this disclosure. Further, the processing of the various components of the illustrated systems may be distributed across multiple machines, networks, and other computing resources. For example, components of the rule engine, process engine, database and corresponding applications may be implemented as separate devices or on separate computing systems, or alternatively as one device or one computing system. In addition, two or more components of a system may be combined into fewer components. Further, various components of the illustrated systems may be implemented in one or more virtual machines, rather than in dedicated computer hardware systems. Likewise, the databases and other storage locations shown may represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Depending on the embodiment, certain acts, events, or functions of any of the algorithms described herein may be performed in a different sequence, may be added, merged, or left out altogether (e.g., not all described acts or events are necessary for the practice of the algorithms). Moreover, in certain embodiments, acts or events may be performed concurrently, e.g., through multi-threaded processing, interrupt processing, or multiple processors or processor cores or on other parallel architectures, rather than sequentially.

Figure 4:
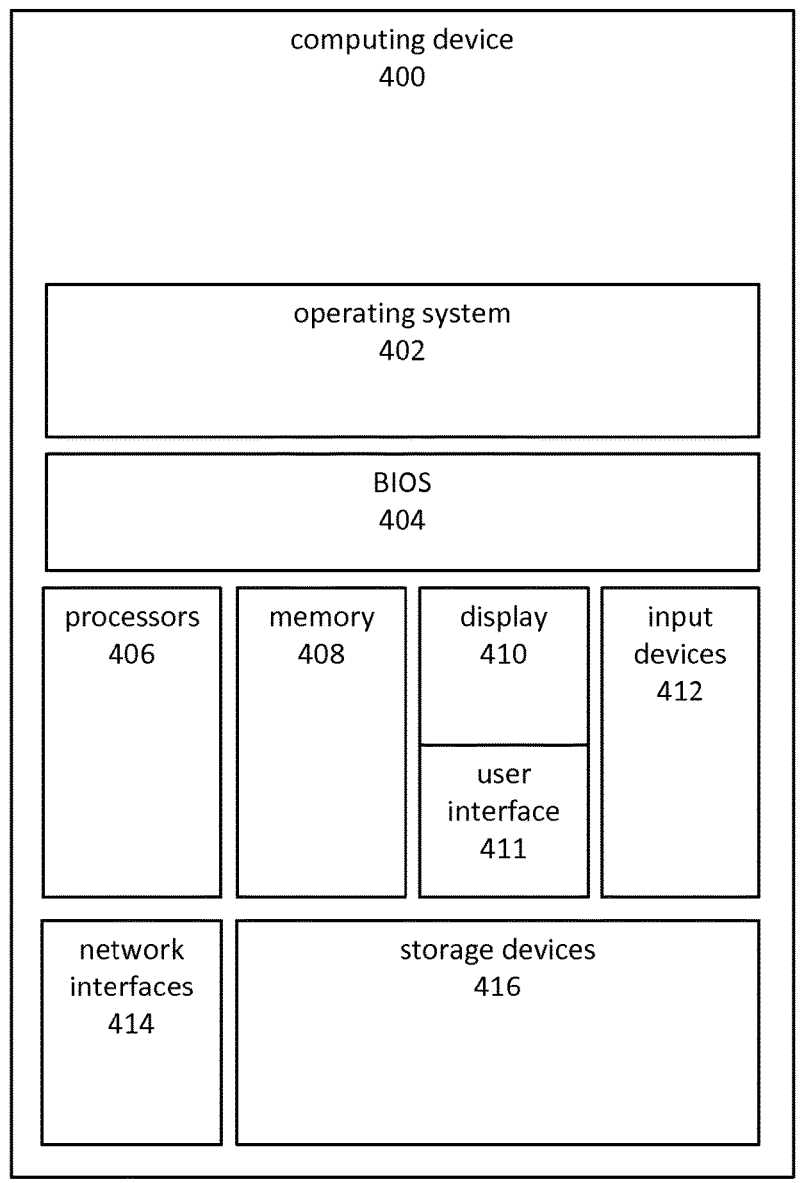
FIG. 4 is a block diagram of a computing system.

FIG. 4 depicts an embodiment of an exemplary implementation of a computing device 400 suitable for practicing aspects of the present disclosure. Computing device 400 may be configured to perform various functions described herein by executing instructions stored on memory 408 and/or storage device 416, or over a network via network interfaces 414. Various examples of computing devices include personal computers, cellular telephones, smartphones, tablets, workstations, servers, and so forth. Embodiments may also be practiced on distributed computing systems comprising multiple computing devices communicatively coupled via a communications network.

One or more processors 406 includes any suitable programmable circuits including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example embodiments are not intended to limit in any way the definition and/or meaning of the term "processor."

Memory 408 and storage devices 416 include non-transitory computer readable storage mediums such as, without limitation but excluding signals per se, random access memory (RAM), flash memory, a hard disk drive, a solid state drive, a diskette, a flash drive, a compact disc, a digital video disc, and/or any suitable memory. In the exemplary implementation, memory 408 and storage device 416 may include data and/or instructions embodying aspects of the disclosure that are executable by processors 406 (e.g., processor 406 may be programmed by the instructions) to enable processors 406 to perform the functions described herein. Additionally, memory 408 and storage devices 416 may comprise an operation system 402, basic input-output system ("BIOS") 404, and various applications.

Display 410 includes at least one output component for presenting information to a user of the computing device and may incorporate a user interface 411 for providing interactivity through the display 410. Display 410 may be any component capable of conveying information to a user of the computing device. In some implementations, display 410 includes an output adapter such as a video adapter and/or an audio adapter or the like. An output adapter is operatively coupled to processor 406 and is configured to be operatively coupled to an output device such as a display device (e.g., a liquid crystal display (LCD), organic light emitting diode (OLED) display, cathode ray tube (CRT), "electronic ink" display, or the like) or an audio output device (e.g., a speaker, headphones, or the like).

Input Devices 412 includes at least one input component for receiving input from a user. Input component 412 may include, for example, a keyboard, a pointing device, a mouse, a stylus, a touch sensitive panel (e.g., a touch pad or a touch screen incorporated into the display 410), a gyroscope, an accelerometer, a position detector, an audio input device, or the like. A single component such as a touch screen may function as both an input device 412 and a display 410.

Network interfaces 414 may comprise one or more devices configured to transmit and receive control signals and data signals over wired or wireless networks. In various embodiments, one or more of network interfaces 414 may transmit in a radio frequency spectrum and operate using a time-division multiple access ("TDMA") communication protocol, wideband code division multiple access ("W-CDMA"), and so forth. In various embodiments, network interfaces 414 may transmit and receive data and control signals over wired or wireless networks using Ethernet, 802.11, Internet protocol ("IP") transmission, and so forth. Wired or wireless networks may comprise various network components such as gateways, switches, hubs, routers, firewalls, proxies, and so forth.

Conditional language used herein, such as, among others, "may," "might," "e.g.," and the like, unless specifically stated otherwise, or otherwise understood within the context as used, is generally intended to convey that certain embodiments include, while other embodiments do not include certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated may be made without departing from the spirit of the disclosure. As will be recognized, the processes described herein may be embodied within a form that does not provide all of the features and benefits set forth herein, as some features may be used or practiced separately from others. The scope of protection is defined by the appended claims rather than by the foregoing description. All changes which come within the meaning and range of equivalency of the claims are to be embraced within their scope.

What is claimed:

1. A system for managing access of a computing device to one or more services over a network, comprising:
a first server configured to:

receive a first request for a service among the one or more services from the computing device, when the computing device has a valid data plan for using the network, permit the first request for the service, when the computing device does not have a valid data plan for using the network, send the first request to a second server configured to translate the first request for the service to a first IP address if the first request is for an allowed service among the one or more services and translate the first request for the service to a second IP address if the first request is for a disallowed service among the one or more services, receive the first IP address or the second IP address from the second server, and send the first IP address or the second IP address to the computing device; and a filter configured to:

receive a second request from the computing device based on either the first IP address or the second IP address, permit the second request if the second request corresponds to the first IP address, and deny the second request if the second request corresponds to the second IP address.

2. The system as recited in claim 1, further comprising a labeler configured to receive the second request and label the second request with a label indicating if the second request corresponds to the first IP address or the second IP address, the labeler being further configured to route the second request to the filter based on the label.

3. The system as recited in claim 2, wherein the label includes an encapsulated packet of one or more network protocols.

4. The system as recited in claim 1, wherein the filter is further configured to route the second request to a deny page on a web server if the second request is denied.

5. The system as recited in claim 1, wherein the second request is for a computer application accessible over the network, and wherein the filter is further configured to route the second request to a private gateway through which the computer application can be accessed.

6. The system as recited in claim 1, wherein the second request is for a computer application accessible over the network, and wherein the filter is further configured to route the second request to a public gateway through which the computer application can be accessed.

7. The system as recited in claim 1, wherein the second request is permitted based on a prior arrangement by an entity with a service provider to enable access to the service.

8. The system as recited in claim 7, wherein the entity provided the computing device.

9. The system as recited in claim 7, wherein the entity did not provide the computing device.

10. A non-transitory computer readable storage medium comprising instructions for managing access of a first computing device to one or more services over a network that, when executed on one or more second computing devices, cause the one or more second computing devices to at least:

receive a first request for a service among the one or more services from the first computing device;

when the first computing device is supported by a data plan, permit the first request for the service;

when the first computing device is not supported by a data plan, translate the first request to a first IP address if the first request is for allowed service and translate the first request to a second IP address if the first request if for a disallowed service;

send the first IP address or the second IP address to the first computing device;

receive a second request from the first computing device based on either the first IP address or the second IP address; and permit the second request if the second request corresponds to the first IP address and deny the second request if the second request corresponds to the second IP address.

11. The non-transitory computer readable storage medium as recited in claim 10, the instructions further causing the one or more second computing devices to:

receive the second request and label the second request with a label indicating if the second request corresponds to the first IP address or the second IP address; and route the second request based on the label.

12. The non-transitory computer readable storage medium as recited in claim 11, wherein the second request is routed to a deny page on a web server if the second request is denied.

13. The non-transitory computer readable storage medium as recited in claim 10, wherein the second request is for a computer application accessible over the network, and wherein the instructions further cause the second request to be routed to a private gateway through which the computer application can be accessed.

14. The non-transitory computer readable storage medium as recited in claim 10, wherein the second request is for a computer application accessible over the network, and wherein the instructions further cause the second request to be routed to a public gateway through which the computer application can be accessed.

15. The non-transitory computer readable storage medium as recited in claim 10, wherein the second request is permitted based on a prior arrangement by an entity with a service provider to enable access to the service.

16. The non-transitory computer readable storage medium as recited in claim 15, wherein the entity provided the computing device.

17. The non-transitory computer readable storage medium as recited in claim 15, wherein the entity did not provide the computing device.

* * * * *